United States Patent [19]

Kano et al.

[11] 4,190,760
[45] Feb. 26, 1980

[54] WELDING APPARATUS WITH SHIFTING MAGNETIC FIELD

[75] Inventors: Motomi Kano, Fujisawa; Keiichiro Hirakoso, Tokyo; Katsuhiko Nomura, Kamakura, all of Japan

[73] Assignee: Kobe Steel, Ltd., Kobe, Japan

[21] Appl. No.: 797,630

[22] Filed: May 16, 1977

[30] Foreign Application Priority Data

May 14, 1976 [JP] Japan .................................. 51/56233
Oct. 28, 1976 [JP] Japan ................................ 51/130117

[51] Int. Cl.² ............................................ B23K 9/00
[52] U.S. Cl. .................................. 219/128; 219/123; 219/137 R
[58] Field of Search ............... 219/128, 123, 73 R, 219/137 R, 136

[56] References Cited

U.S. PATENT DOCUMENTS

| 379,453 | 3/1888 | De Benardos | 219/137 R X |
|---|---|---|---|
| 1,792,243 | 2/1931 | Richter | 219/123 X |
| 1,854,536 | 4/1932 | Wilson | 219/123 |
| 1,869,350 | 7/1932 | Lincoln | 219/123 |
| 2,666,122 | 1/1954 | Curtin | 219/123 |
| 2,702,846 | 2/1955 | Breymeier | 219/123 X |
| 3,130,294 | 4/1964 | Regnauld | 219/123 |
| 3,320,402 | 5/1967 | Cunningham | 219/123 |
| 3,924,092 | 12/1975 | Lessmann | 219/123 X |
| 3,941,974 | 3/1976 | Kano | 219/123 X |
| 4,027,135 | 5/1977 | Barger | 219/123 X |

FOREIGN PATENT DOCUMENTS

| 395312 | 7/1933 | United Kingdom | 219/128 |
|---|---|---|---|
| 230342 | 10/1968 | U.S.S.R. | |
| 510337 | 6/1976 | U.S.S.R. | 219/128 |

*Primary Examiner*—Elliot A. Goldberg
*Attorney, Agent, or Firm*—Oblon, Fisher, Spivak, McClelland & Maier

[57] ABSTRACT

The present invention relates to a welding process and apparatus. More particularly, the invention relates to a welding process and apparatus for performing welding in various positions characterized in that a shifting magnetic field is generated in the vicinity of a molten metal pool to induce an eddy current in the molten metal pool, whereby an electromagnetic driving force is caused to act on the molten metal pool to control the shape of the molten metal pool, and welding is carried out while controlling the shape of the molten metal pool in this manner. According to the welding process and apparatus of the present invention, the welding efficiency can be enhanced irrespective of any welding positions.

5 Claims, 22 Drawing Figures

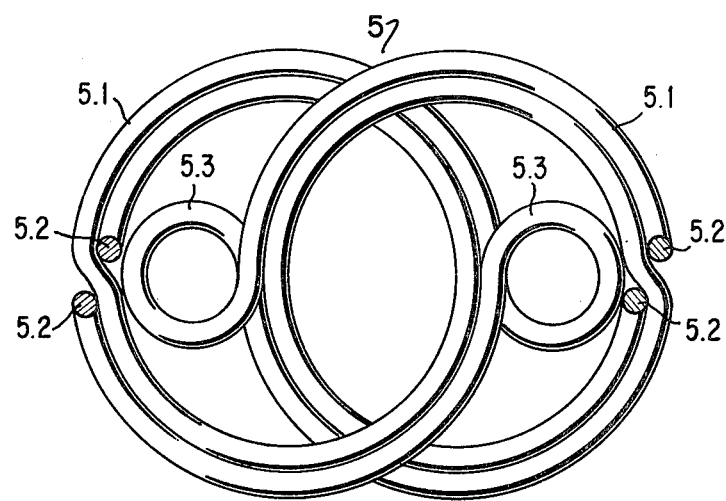
FIG.1a
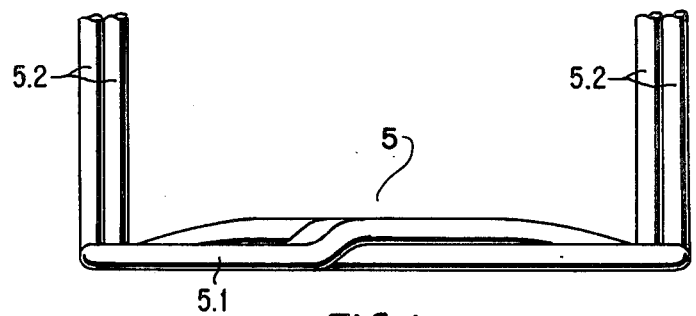
FIG.1b
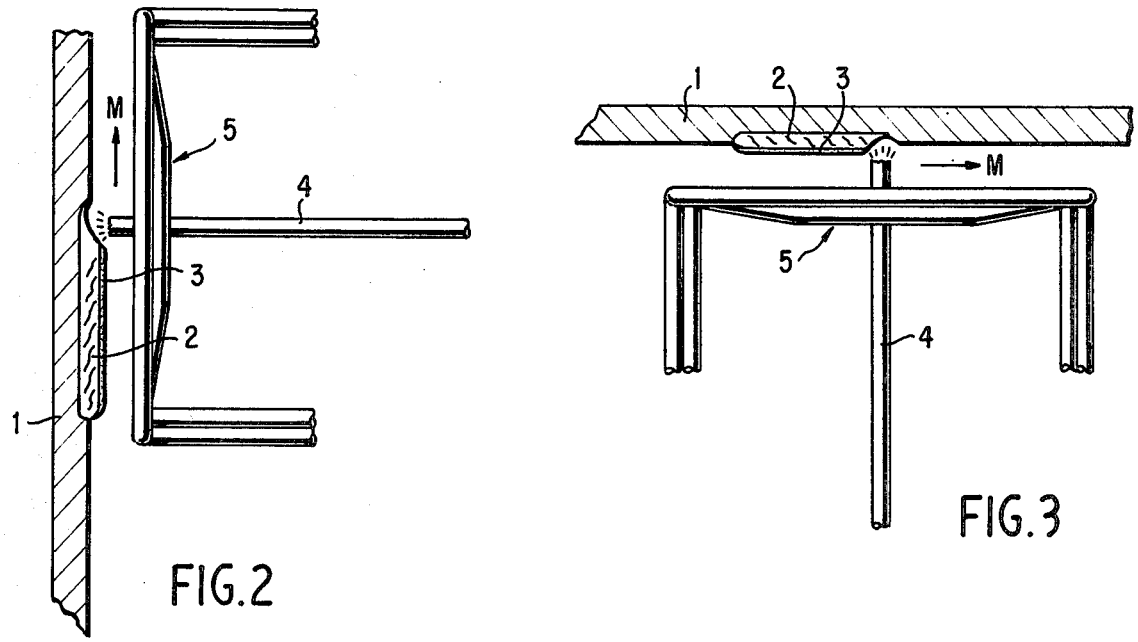
FIG.2
FIG.3

WELDING APPARATUS WITH SHIFTING MAGNETIC FIELD

BACKGROUND OF THE INVENTION (1) Field of the Invention

The present invention relates to a welding process and apparatus. More particularly, the invention relates to a welding process and apparatus in which by applying a force acting in an optional direction to a molten metal pool by a shifting magnetic field, welding of various positions can be facilitated and the welding efficiency and the quality of weld metal can be improved.

(2) Description of the Prior Art

The easy or difficulty of a conventional welding operation is remarkably influenced by the welding position. In general, flat welding is easiest, but in case of horizontal fillet welding, horizontal welding, vertical upward welding, vertical downward welding and overhead welding, various limitations are added to conditions adopted in flat welding, and problems such as reduction of the welding speed, degradation of the quality of weld metal and reduction of the welding efficiency are brought about. Needless to say, these problems owing to the difference of the welding position are caused by gravity acting on the molten metal pool.

Various methods have heretofore been proposed for preventing sagging of a molten metal pool or controlling the shape of the molten metal pool.

For example, the specification of U.S. Pat. No. 3,584,181 (to Nemoto et al) proposes a submerged arc welding method for hard facing, in which a tape electrode is used and in order to prevent detrimental influences of a magnetic field formed around the electrode, a coil being disposed around a material to be welded to apply an additional magnetic field thereto and form a uniform surface built-up portion.

The specification of U.S. Pat. No. 3,701,881 (to Rother et al) discloses a method for welding thin metal sheets in which butt welding is made possible without use of foils or while eliminating the subsequent heat treatment, by shifting the arc from the position of a core of a welding torch relatively to the metal sheets by an action of a magnetic field.

The specification of U.S. Pat. No. 3,885,123 (to Sciaky et al) discloses a welding apparatus in which two welding torches are used and arcs of the two torches are brought close to each other by utilizing a magnetic field.

Further, the specification of U.S. Pat. No. 3,941,974 (to Kano et al) proposes a welding method for obtaining deep penetrations, in which the direction of the arc is controlled by a magnetic field generated by an auxiliary current.

Even according to these conventional techniques, however, the welding operation cannot be performed at a high efficiency in case of welding of difficult positions, for example, vertical welding, horizontal welding or overhead welding.

SUMMARY OF THE INVENTION

It is therefore a primary object of the present invention to provide a welding process and apparatus in which welding can be performed at such a high efficiency as not attainable according to conventional techniques.

A second object of the present invention is to provide a welding process and apparatus in which welding can be performed at a high efficiency even in welding positions in which welding is relatively difficult, for example, even in vertical, horizontal and overhead positions.

A third object of the present invention is to provide a welding process and apparatus in which welding can be conducted at a high speed while controlling humping in the bead.

A fourth object of the present invention is to provide a welding process and apparatus in which one-side welding is possible without using a backing strip.

A fifth object of the present invention is to provide a welding process and apparatus in which a high quality weld metal can be obtained by appropriately adjusting the width, penetration depth and appearance of the bead.

BRIEF DESCRIPTION OF THE DRAWING

Various other objects, features and attendant advantages of the present invention will be more readily apparent as the same becomes better understood by reference to the following detailed description when considered in connection with the accompanying drawings, and wherein:

FIG. 1-a is a plan view showing a driving coil that is used for generating a shifting magnetic field in the present invention.

FIG. 1-b is an elevational view of the driving coil shown in FIG. 1-a.

FIG. 2 is a diagram illustrating an embodiment in which the present invention is applied to vertical upward welding.

FIG. 3 is a diagram illustrating an embodiment in which the present invention is applied to overhead butt welding.

DETAILED DESCRIPTION OF THE PREFERRED EMBODIMENTS

Figure 4:
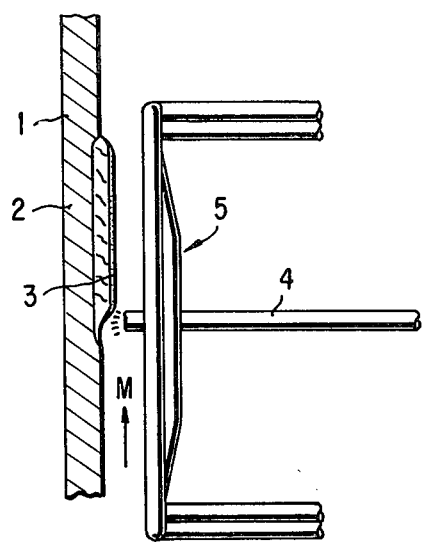
FIG. 4 is a diagram illustrating an embodiment in which the present invention is applied to vertical downward welding.

The present invention maintains a molten metal and controls its shape by applying a shifting magnetic field to a melt of a welding material based on the principle of generation of a driving force by a linear induction motor (hereinafter referred to as "linear motor") and generating a driving force for the molten metal according to Fleming's left-hand law.

An induction motor comprises a primary coil and a secondary coil, and in general, the primary coil is wound on a peripheral stator and a polyphase alternating current is supplied thereto to generate a rotating field. The secondary coil is ordinarily wound on an interior rotor by one turn or a plurality of turns and is short-circuited directly or through a resistance. When the rotation speed of the rotor is different from the rotation speed of the rotating field generated by the stator, for example, in the stationary state, a current is generated in the secondary coil by electromagnetic induction (a kind of the action of a transformer), and by the mutual action of this current and the magnetic flux, a driving force is generated in the secondary coil according to Fleming's left-hand law. When this phenomenon is seen from the macroscopic viewpoint, it may be considered that a rotating force is generated in the rotor in a direction to be attracted by the rotating field of the stator.

In a linear motor, the stator and rotor of the above-mentioned induction motor are not arranged circularly but linearly. The principle of generation of a driving force in the linear motor is the same as in an ordinary induction motor.

When this driving force is applied to welding, since a material to the welded corresponds to the secondary coil, the structure is inevitably incomplete electrically and magnetically. More specifically, when a material to be welded is a ferrous metal, the volume resistivity of this material is about 140 $\mu\Omega$-cm at a temperature approximating the melting point, and this value is about 100 times as high as the volume resistivity of a coil material, for example, copper which has a volume resistivity of 1.7 $\mu\Omega$-cm. The rotor of the induction motor is packed with laminated iron sheets so that magnetic fluxes can easily pass through the rotor except the coil portion, but in case of welding, in general, a gas space is inevitably necessary for the operation, and this gas space constitutes a part of the magnetic circuit and the magnetic resistance of this gas space is extremely high. Accordingly, even if a relatively large magnetomotive force is applied, the magnetic flux density on the weld metal is very low and hence, a large driving force cannot be expected.

As means for enhancing sufficiently the driving force, namely the holding force acting on a molten substance, there is effectively adopted a method in which the magnetic flux density on a material to be welded is increased and a method in which the frequency of a polyphase alternating current to be supplied to a primary electromagnet is increased. The effect of the latter method is especially prominent.

Figure 20:
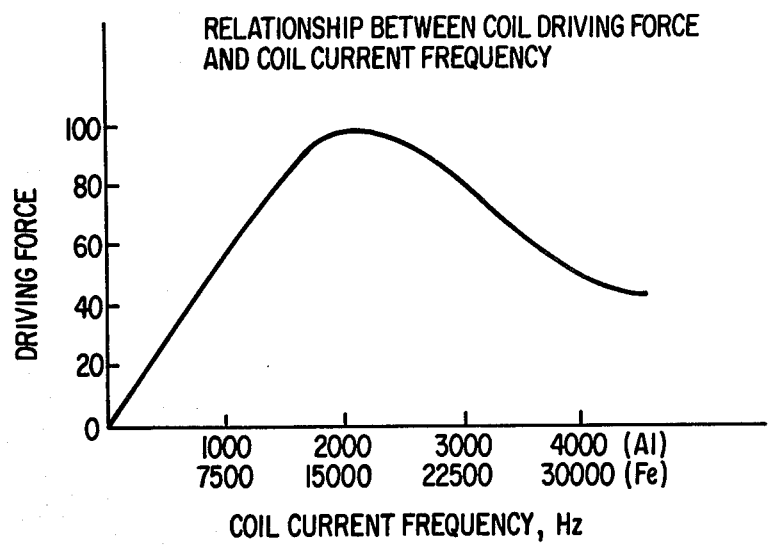
FIG. 20 is a graph showing the relationship between coil driving force and coil current frequency when the base metal is aluminum or iron.

In connection with the former method, if iron cores are used for a primary coil and a surrounding magnetic circuit-constituting member in a linear motor, it will be possible to attain substantially the magnetic saturation value, and this can also be attained if the size or scale of the magnetic circuit-constituting member is increased. As more effective means, there may be considered a method in which the primary coil and the magnetic circuit-constituting material are brought close to the material to be welded as much as possible. However, each of these methods is limited from a practical viewpoint, and no sufficient driving force can be obtained only by such method. Therefore, it is preferred to adopt the latter method (adjustment of the frequency) in combination. In connection with the relation between the driving force and the frequency, according to conventional theory of induction motors, it has been considered that "under the same current conditions of a primary coil, the driving force is not influenced by the frequency". However, we found the fact contrary to this conventional concept. More specifically, we made experiments under the same current conditions of a primary electromagnet by using three frequencies, namely a commercial frequency (50 Hz), a frequency of 100 Hz and a frequency of 400 Hz. When an aluminum sheet having a thickness of 1 mm was used as an equivalent to the secondary coil, it was found that a largest driving force was obtained by using the frequency of 400 Hz. When an austenite type stainless steel sheet was used as an equivalent to the secondary coil, it was found that a higher frequency provided a larger driving force in the frequency range of from 50 to 15,000 Hz. Namely it was found that a direct proportional relationship is established between the frequency and the driving force if the frequency is within a certain range. The above mentioned facts were confirmed by FIG. 20 showing the relationship between the coil driving force and the coil current frequency when the base metal is aluminum and iron, respectively. We found that from those facts, the practical frequency in case of aluminum base metal is 200–4,000 Hz, i.e., in this range, efficient driving force could be obtained, so that this range is desirable, while in case of iron base metal, a frequency range of 1,500–30,000 Hz is desirable.

Based on the above finding, two two-wound air-core coils having an inner diameter of 80 mm were disposed at points 15 mm apart from a weld bead and a two-phase alternating current was supplied to the coils from an alternating current power source having a frequency of 15 KHz and a capacity of 7 KVA, and under these conditions mild steel sheets were subjected to covered electrode arc welding in the vertical position. As a result, it was found that molten iron facing the coil is moved in the direction of shifting of the magnetic field against the gravity and sagging of the bead could be assuredly prevented.

In case of a linear motor, the driving force is influenced by a frequency of a current to be supplied to a primary electromagnet, though the driving force is not influenced by such frequency in case of an ordinary induction motor. It is believed that such difference may be caused by the fact that in the ordinary induction motor the primary and secondary circuits are connected very tightly though in the linear motor this connection is very loose or that in the linear motor the conductivity of the secondary conductor is insufficient.

Various methods may optionally be adopted for generating a shifting magnetic field applying a unidirectional force to a molten metal or the like. In general, a method in which a polyphase alternating current is applied to a coil can be practiced most easily, and in addition, there may be adopted a method in which a permanent magnet or a direct current or alternating current electromagnet is rotated or shifted linearly at a high speed.

The acting direction of this shifting magnetic field may be appropriately selected depending on the desired direction of a force to be generated. For example, the acting direction of the shifting magnetic field may be any of linear, circular, arc and partially elliptical directions or a composite thereof (for example, a composite of the welding direction and a direction rectangular thereto). If such adjustment of the direction of the shifting magnetic field is appropriately combined with means of increasing or decreasing an exciting current or changing over the acting direction, maintenance of a molten metal pool in the weld zone or control of the shape of the molten metal pool can be accomplished appropriately.

The present invention can be applied to not only coated electrode arc welding illustrated in Examples given hereinafter but also other various welding methods, for example, submerged arc welding, gas shield arc welding, non-gas welding, TIG welding, plasma welding, plasma arc welding, electron beam welding, light welding and laser welding. In electroslag or electrogas welding, a copper or graphite sheet is ordinarily used as a leakage-preventing backing material. In the present invention, however, such backing material prevents the shifting magnetic field from arriving at the molten metal pool. Accordingly, it is preferred that a non-conductive refractory material be used as such backing material.

Materials to be welded in the present invention should be electrically conductive, but the intended effects of the present invention can be attained whether they may be magnetic or not. In other words, the present invention can be applied to welding of substantially all of metals and alloys, for example, pure iron, soft steels, low alloyed steels, high-alloyed steels such as stainless steels, copper, aluminum and nickel.

As will be apparent from the foregoing illustration, according to the present invention, by applying a polyphase alternating current magnetic field to a weld zone by using a linear motor, a driving force can be applied to a weld bead in a desirable direction over a relatively broad region. Further, although this driving force has enough intensity to cope with the gravity, it does not cause shaking or vibration in the molten metal pool and it maintains a large quantity of the melt in a desirable shape in the weld zone. It is believed that this advantage is due to the fact that this driving force includes none of the pulsations of harmful frequency components such as caused by blowing of gases and the driving force is generated in the molten material per se (it cannot be avoided that some pulsations are caused in the driving force by disequilibrium in the magnetic circuit, but in general, frequencies of such pulsations are much shorter than the inherent vibration frequency of the molten metal pool).

Accordingly, if the above noted driving force is caused to act on the molten metal pool while controlling the intensity and direction of the driving force appropriately, in welding of various positions such as vertical and horizontal positions, the molten metal pool can be maintained at a predetermined position of the weld zone and welding can be performed effectively and conveniently without occurrence of sagging or the like. Further, if the driving force is caused to act from the back side, one-side welding becomes possible even without using a backing strip. Still further, also in flat welding, a desirable shape of the molten metal pool can be maintained and preceding of the molten metal can be prevented, whereby sufficient penetration and fusion can be assuredly attained and an effect corresponding to the weaving effect can be obtained. In each case, it is expected that the welding efficiency can be remarkably enhanced according to the present invention. Moreover, the foregoing effects can be attained advantageously irrespective of welding positions and procedures if a welding apparatus comprising a welding torch and a welding carriage, in which a device for generating a shifting magnetic field is disposed so that the shifting magnetic field traverses a molten metal pool of a weld zone, is employed for practicing the above welding process of the present invention.

Specific embodiments of the present invention will now be described in detail by reference to the following Examples.

In each embodiment, two coils are employed. More specifically, as shown in FIGS. 1-$a$ and 1-$b$, a pair of driving coils 5, each comprising a main coil portion 5.1, driving coil terminals 5.2 and a subsidiary coil 5.3 for preventing induction coupling, are used and a two-phase alternating current is applied to this pair of driving coils 5 by a transistor inverter having a frequency of 15 KHz and a capacity of 7 KVA. In FIG. 1, the driving coils are disposed so that their centers are staggered from each other by a distance corresponding to the radius thereof. Each of the driving coils has an inner diameter of 80 mm and is a two-wound water-cooled coil. A coated arc welding rod or an automatic welding head is inserted into a space defined by the two coils, and welding is carried out in this state. Condensers are arranged in parallel to these coils and they are caused to resonate with the frequency of the power source so as to reduce the driving power.

EXAMPLE 1

The driving coil 5 is disposed as shown in FIG. 2, and under conditions described below, vertical upward arc welding using a coated electrode is carried out while shifting a base metal downwardly at a constant speed and fixing the positions of the welding arc and the driving coil.

Welding Conditions:
Base metal: mild steel plate having a thickness of 12 mm
Welding rod: flux coated electrode having a diameter of 4.0 mm
Welding current: 160 A, AC (50 Hz)

Manipulation of electrode: straight movement on the plate
Position of driving coils: 15 mm above the base metal
Voltage applied to driving coil: 100 V (peak-to-peak value, hereinafter referred to "p-p" value)
Welding Results:

At a base metal-shifting speed of 15 cm/min, a continuous weld bead be obtained stably. When welding is carried out without supplying an electric power to the driving coil, sagging of the molten metal is caused at a welding current of 160 A and a continuous bead cannot be obtained stably.

EXAMPLE 2

The driving coil is disposed as shown in FIG. 3 and overhead welding is carried out.
Welding Conditions:
Base metal: soft steel plate having a thickness of 12 mm
Welding rod: same as used in Example 1
Welding current: 130 A, AC (50 Hz)
Manipulation of electrode: straight movement on the plate, overhead position
Position of driving coil: 15 mm below the surface of the base metal
Direction of shifting magnetic field: same as welding direction
Voltage applied to driving coil: 100 V (p-p value)
Welding Results:

A good weld bead can be obtained at a base metal-shifting speed of 20 cm/min. When supply of the power to the driving coil is stopped, sagging is caused in the molten metal pool and welding cannot be performed stably.

In this embodiment, it is believed that the effect of the shifting magnetic field is attained in the following manner:

When with growth of the molten metal pool and increase of the amount of the molten metal, drops of the molten metal come close to the driving coil, since the linear driving force is abruptly increased, the molten metal is not allowed to sag down but is returned to the pool disposed ahead. As a result, sagging is hardly caused.

EXAMPLE 3

The positional relationship between the weld zone and the driving coil is set as in Example 1 and only the welding position is changed as shown in FIG. 4. In this state, vertical downward welding is carried out.
Welding Conditions:
Base metal: mild steel plate having a thickness of 6 mm
Welding rod: same as in Example 1
Welding current: 160 A, AC (50 Hz)
Manipulation of electrode: straight movement on the plate, vertical downward position
Position of driving coil: 15 mm above the base metal
Voltage applied to driving coil: 100 V (p-p value)
Welding Results:

A good weld bead is obtained at a base metal-shifting speed of 25 cm/min. When the driving coil is not actuated, a good bead cannot be obtained because of sagging of the molten metal pool.

EXAMPLE 4

Figure 5:
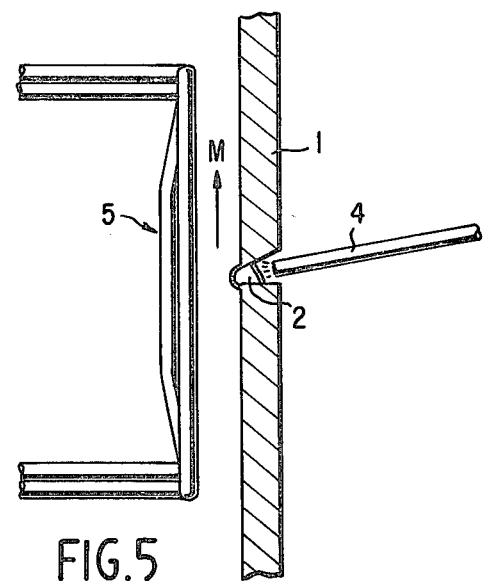
FIG. 5 is a diagram illustrating an embodiment in which the present invention is applied to horizontal one-side welding.

Welding is carried out in a horizontal position as shown in FIG. 5. No backing strip is used but the driving coil is disposed on the back side.
Welding Conditions:
Base metal: soft steel plates having a thickness of 9 mm butted in the V-figured shape (the groove angle of the lower plate is zero, the groove angle of the upper plate is 45°, and the groove gap is 2 mm)
Welding rod: same as in Example 1
Welding current: 160 A, AC (50 Hz)
Manipulation of electrode: horizontally straight movement, root pass
Position of driving coil: 10 mm from the back face of the base metal
Voltage applied to driving coil: 25 V (p-p value)
Welding Results:

Uranami welding is not impossible if carefully conducted, even when the driving coil is not excited. However, if the driving coil is excited, sagging of the back bead can be prevented assuredly and a uniform bead having a good appearance can easily be obtained.

In this embodiment, the present invention is applied to formation of a back bead by one-side welding. Needless to say, the present invention can similarly be applied to formation of a front bead by horizontal welding. Further, a similar effect can be attained also in case of horizontal fillet welding. For example, in case of horizontal fillet welding, if the shifting magnetic field is caused to act in a direction inclined by 45° from the horizontal plane, sagging of the molten metal and slag is prevented by an upward component of the magnetic field and the appearance of the weld metal can be improved. If it is not intended to improve the appearance, the welding current can be increased and the operation efficiency can be improved.

EXAMPLE 5

The driving coil is arranged as shown in FIG. 3 and flat welding is carried out in this state.
Welding Conditions:
The welding conditions are the same as in Example 3 except the manipulation of the electrode (the straight movement on the plate for the flat welding position).
Welding Results:

"Preceding" of the molten material, which is readily caused at a low welding speed, can be completely prevented, and formation of defects by lack of fusion can be prevented assuredly.

EXAMPLE 6

Figure 6A:
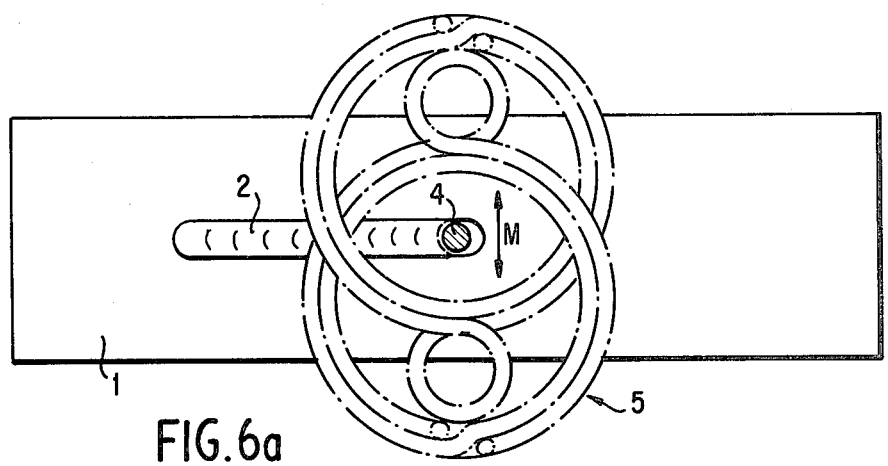
FIG. 6a is a diagram illustrating an embodiment in which the present invention is applied to flat welding.

Flat welding is carried out as shown in FIG. 6a to confirm the weaving effect.
Welding Conditions:
Base metal: mild steel plate having a thickness of 12 mm
Welding rod: same as used in Example 1
Welding current: 160 A, AC (50 Hz)
Manipulation of electrode: straight movement on the plate
Position of the driving coil: 15 mm above the base metal
Shifting direction of magnetic field: rectangular to the welding direction but parallel to the plate face; reversed at a frequency of one time per second
Voltage applied to driving coil: 20 V (p-p value)
Welding Results:

When welding is manually conducted at a welding speed of 25 cm/min, the bead width is 11 mm and the penetration depth is 1.5 mm if the shifting magnetic field is not generated, but if the shifting magnetic field is generated, the bead width is 16 mm and the penetration depth is 1.1 mm. Thus, it is confirmed that the weaving effect can be attained.

EXAMPLE 7

Figure 6B:
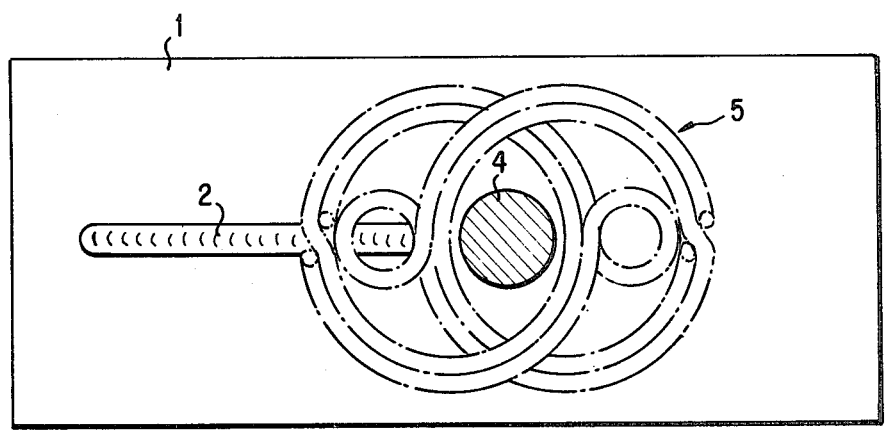
FIG. 6b is a diagram illustrating another embodiment in which the present invention is applied to flat welding.
Figure 7:
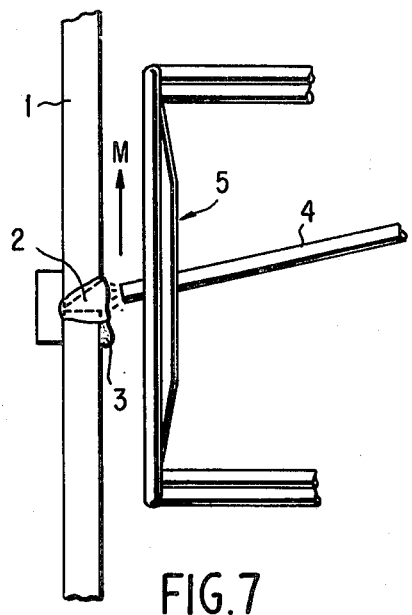
FIG. 7 is a diagram illustrating an embodiment in which the present invention is applied to horizontal one-side welding.
Figure 8:
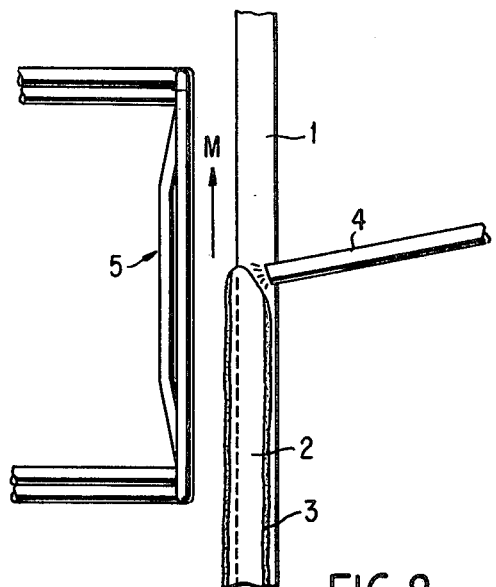
FIG. 8 is a diagram illustrating an embodiment in which the present invention is applied to vertical one-side welding.
Figure 9:
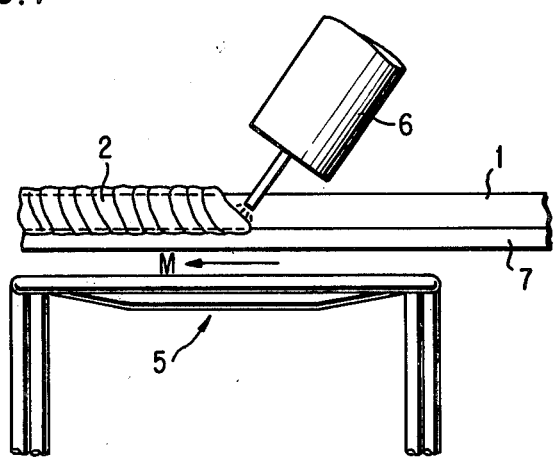
FIG. 9 is a diagram illustrating an embodiment of the present invention in which flat one-side welding is carried out while shifting a magnetic field in a direction opposite to the welding direction in the vicinity of a molten metal pool on the back side thereof.
Figure 10:
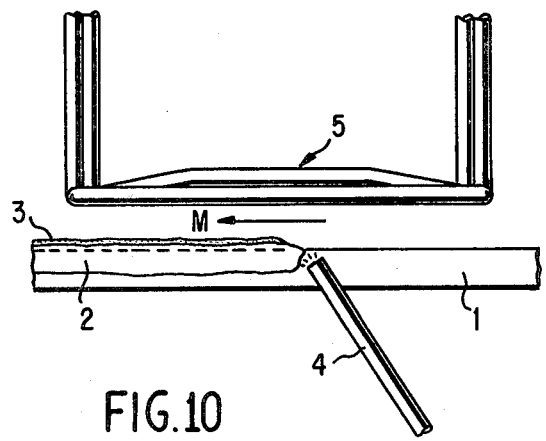
FIG. 10 is a diagram illustrating an embodiment of the present invention in which overhead welding is carried out while shifting a magnetic field in a direction opposite to the welding direction in the vicinity of a molten metal pool on the upper side thereof.

The driving coil 5 shown in FIG. 1 is disposed to attain a positional relationship shown in FIG. 6b to a material to be welded. Positions of the welding nozzle 4 and driving coil 5 are fixed, and flat high-speed welding is carried out according to the gas shield arc welding method while moving horizontally the material 1 to be welded toward the left in FIG. 6b at a constant speed. Welding conditions and obtained results are as follows.

Figure 14:
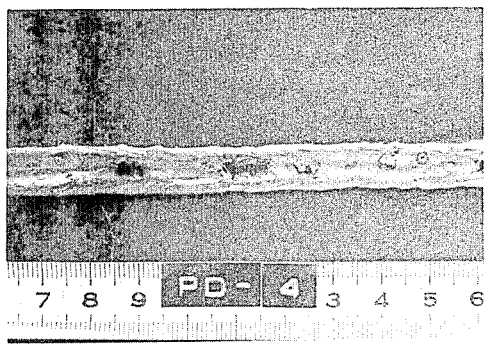
FIG. 14 is a picture showing the appearance of a bead of a weld zone formed according to the present invention.
Figure 15:
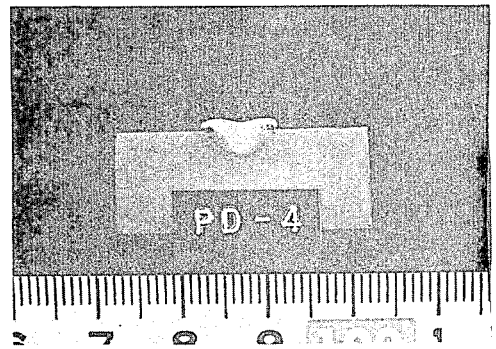
FIG. 15 is a macro-photograph showing the section of the bead shown in FIG. 14.
Figure 16:
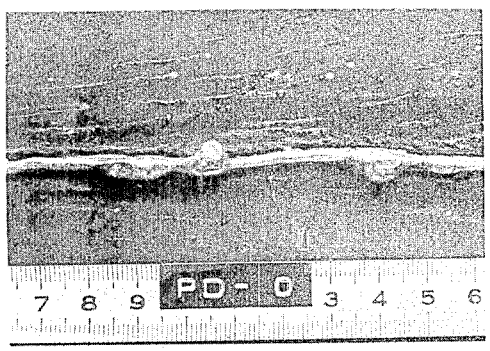
FIG. 16 is a picture showing the appearance of a bead of a weld zone formed according to a conventional method.
Figure 17:
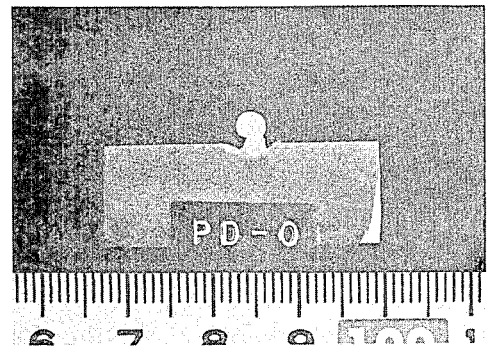
FIG. 17 is a macro-photograph showing the section of the bead shown in FIG. 16.

Welding Conditions:
Base metal: mild steel plate having a thickness of 12 mm
Welding wire: wire for MIG welding, 1.6 mm in diameter
Welding voltage and current: 34 V, 500 A (DCRP: direct current reverse polarity)
Shield gas: 80% Ar+20% $O_2$ (25 l/min)
Manipulation of electrode: straight movement on the plate
Voltage applied to driving coil: 50 V (p-p value)
Welding Results:

At a plate-shifting speed of 5 m/min, a uniform continuous weld bead can be obtained stably. The appearance and section of the so obtained bead are shown in FIGS. 14 and 15, respectively. The appearance and section of a bead obtained when supply of the power to the driving coil is stopped during welding are shown in FIGS. 16 and 17, respectively. As is apparent from FIGS. 16 and 17, if the driving coil is not actuated, the bead width is narrow and humping is caused, and further, formation of blow holes is conspicuous.

In case of horizontal, vertical upward, flat, overhead and horizontal fillet weldings as shown in FIGS. 7, 8, 9, 10 and 13, as in the foregoing Examples, the shape of the molten metal pool can be controlled from the electrode side by the shifting magnetic field generated by the driving coil 5 as shown in FIG. 1, and further, the shape of the molten metal pool can be controlled also from the back side of the material to be welded by the shifting magnetic field.

As will be apparent from the foregoing illustration, according to the present invention, by novel and very simple means of applying an electromagnetic driving force of a shifting magnetic field to a molten metal pool, the shape of the molten metal pool can easily be controlled appropriately and assuredly, and the limitation of the welding speed imposed on conventional methods can be eliminated and the welding speed can be elevated to a level at least 2 times the maximum welding speed attainable in the conventional methods. Still further, occurrence of welding defects caused by instability of the shape of the molten metal pool can be prevented completely and high quality weld metals can be assuredly obtained.

However, in the foregoing welding methods, it sometimes happens that an abnormal change is caused in the shape of the bead, and in some case, such troubles as falling or displacement of the molten metal from the groove take place and no uniform bead can be obtained. For example, in case of the above-mentioned flat high-speed welding, when one-pass welding is carried out on soft steel plates having a thickness of 12 mm, which are butted to each other in the I-figured shape with a groove gap of 0.5 mm, the shape of the bead is often changed and the quality of the resulting bead is inferior to that of a bead formed on a flat plate having the same thickness (bead on plate; hereinafter referred to as "B.O.P.")

Accordingly, research was conducted with a view to solving the foregoing problems involved in the welding methods using a shifting magnetic field or high frequency magnetic field and developing a method capable of stabilizing the welding state and assuredly providing uniform beads. As a result, it was found that the welding results are greatly influenced by the mutual tacking positions of materials to be welded. More specifically, the following facts were found.

(1) For example, in case of I-shaped groove welding, if the back faces are tacked with a space larger than the space between N and S poles of the magnetic field-generating device, the bead shape is irregular as compared with the shape of B.O.P. unless the intensity of the magnetic field is doubled or trebled.

(2) If the intensity of the magnetic field is enhanced, the molten metal often falls out of the pool and there is brought about a disadvantage in that it is impossible to maintain the molten metal pool. For example, when a bead having a thickness of about 2 mm is formed on a material to be welded, which has a plate thickness of 12 mm, sagging of the molten metal from a groove gap of 0.5 mm is caused and a uniform bead cannot be formed. This phenomenon cannot be conceived at all from common concepts heretofore known in the art of welding.

(3) When the tacking space of the back faces is equal to or smaller than the space between the poles, a bead having substantially the same appearance as that of B.O.P. can be obtained at substantially the same intensity of the magnetic field, and falling-out of the molten metal can be prevented.

(4) Even if materials to be welded are reinforced by an interposing insulating material in the above cases (1) and (2), no effect can be attained at all.

From the foregoing facts, it may be considered that non-uniformity of the shape of the bead and falling-out of the molten metal will be caused for the following reasons.

Figure 18:
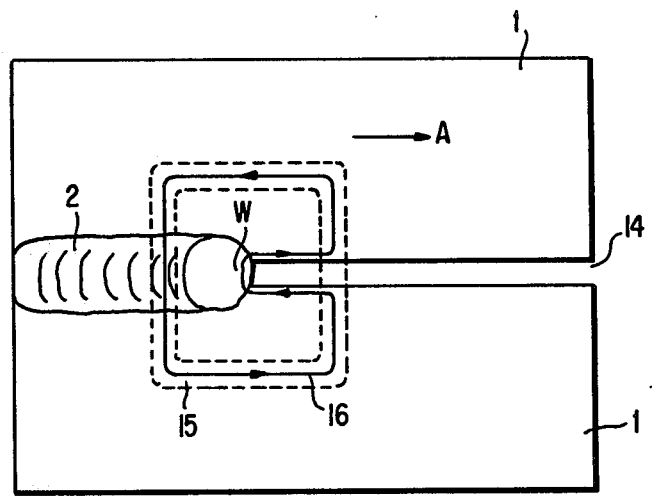
FIG. 18 is a diagram of the vicinity of a weld zone, which illustrates an eddy current passage formed when a groove is electrically insulated.

When materials to be welded are subjected to butt welding in the non-tacked state, welded portions are connected not only mechanically but also electrically, but non-welded portions are separated by the groove. Since an electric current is not allowed to run across the groove, the materials to be welded are electrically insulated in such non-welded portions. For example, as shown in FIG. 18, the groove 14 formed by materials 1 to be welded is welded along the direction indicated by arrow A, and it is supposed that a bead 2 is formed up to the point W, a main welding heat source (not shown) is located just above the point W and that an alternating current is applied to a magnetic field-generating coil 15 (only the periphery is indicated by a broken line) disposed above the materials 1 to be welded with a slight distance, an eddy current generated in the materials 1, which are closing conductors, by the magnetic field-generating coil 15 should run while forming a loop having the same shape as that of the coil 15. However, since the groove 14 is present ahead of the main welding heat source (point W), the eddy current is not allowed to run through this portion, and hence, it flows while forming a loop as indicated by arrow line 16. Therefore, it is construed that local concentration of the electric current takes place at the top end of the bead (point W). When the alternating current flowing in the coil is of a high frequency, this local concentration of the electric current is enhanced by the skin effect. By such local concentration of the electric current, Joule heat is generated at the top end of the bead and in the groove close to the top end of the bead, and the temperature is therefore elevated. In order to control the shape of the molten metal pool effectively, a considerably large eddy current is necessary. For example, in case of welding of steel plates, a vortex current much higher than 1000 A is required. Accordingly, generation of the heat and elevation of the temperature in the top end portion of the bead are violent and solidification of the melt in the groove is inhibited. Therefore, the melt-supporting force, which is caused by increase of the viscosity of the melt and solidification of the melt, is drastically reduced, and as a result, falling-out of the melt and non-uniformity of the shape of the bead are caused.

If falling-out of the melt and non-uniformity of the shape of the bead are caused according to the foregoing mechanism, occurrence of these disadvantages will be prevented by forming an eddy current passage ahead of the welding point of materials to be welded to avoid local concentration of the electric current on the top end of the bead (the molten metal pool).

One preferred embodiment of the present invention was completed based on the foregoing discoveries. More specifically, according to this preferred embodiment of the present invention, in performing welding while inducing an eddy current to a molten metal pool, materials to be welded are electrically connected to each other ahead of a main welding heat source.

Various methods can be adopted for providing an electric connection between materials to be welded. For example, there can be mentioned a method in which powder of a conductive substance having no detrimental influences on the quality of weld metal, such as iron powder, is filled in a groove, a method in which a conductive solid substance such as an iron wire is inserted in a groove and a method in which materials to be welded are tacked at a predetermined interval.

Under some groove conditions, even without using a conductive substance, an electric connection can be attained by bringing materials to be welded sufficiently close to each other. In this case, if the groove portion is formed to have a projecting shape capable of readily undergoing plastic deformation and the materials to be welded are pressed to each other to bring them into close contact with each other by deformation of the groove portion, a good electric connection can always be obtained even if a gap between the two materials is changed.

In addition, an electric connection can be attained by providing another welding arc in the groove portion ahead of the main welding heat source and actuating it together with the main arc. Still further, an electric connection can be attained by disposing one or a plurality of conductive brushes in the groove or in the vicinity of the groove ahead of the main welding heat source, pressing these brushes to materials to be welded by means of a spring or the like and advancing the brushes while having sliding contact with the materials to be welded synchronously with advance of the main arc.

Figure 19:
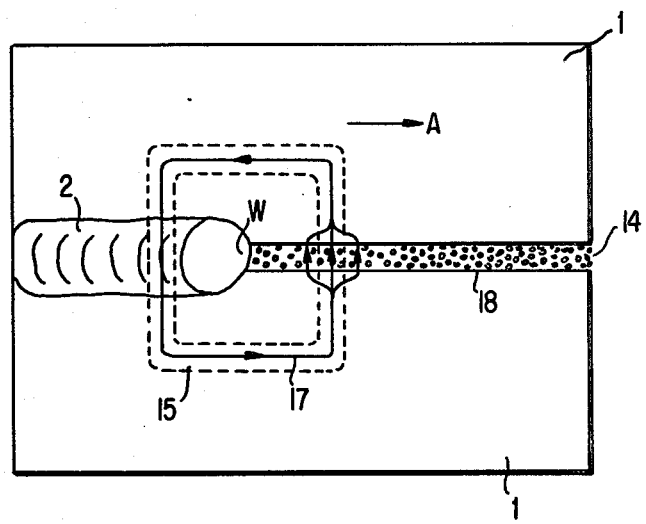
FIG. 19 is a diagram of the vicinity of a weld zone, which illustrates an eddy current passage formed when a groove is electrically connected.

FIG. 19 illustrates the passage of an eddy current in an embodiment in which reduced iron powder is filled in the groove as means for attaining an electric connection through the groove. An eddy current 17 runs through iron powder 18. Concentration of the electric current on the top end W of the bead is effectively prevented in this embodiment, as is seen from FIG. 19.

In case of multi-layer welding, it is sufficient to adopt means for electrically connecting materials to be welded ahead of the main welding heat source only at the step of root pass, and at the step of forming subsequent layers, such means for attaining an electric connect need not be taken into consideration because a good electric connection has already been attained by a weld metal.

The apparatus for use in practicing the above-mentioned welding process of the present invention will now be described by reference to FIGS. 11 and 12.

Figure 11:
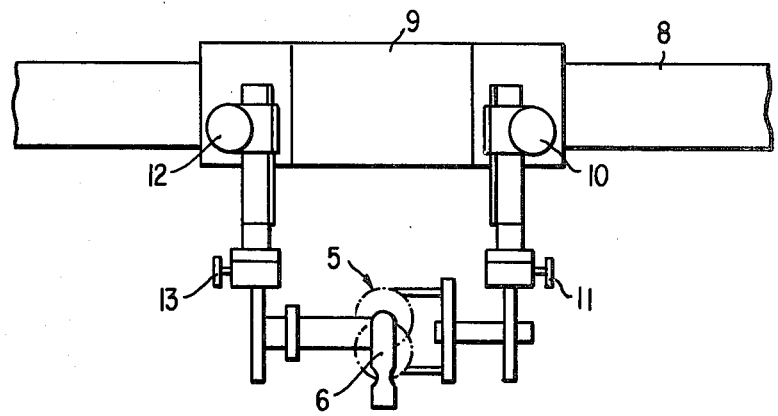
FIG. 11 is a plan view illustrating the welding apparatus of the present invention.
Figure 12:
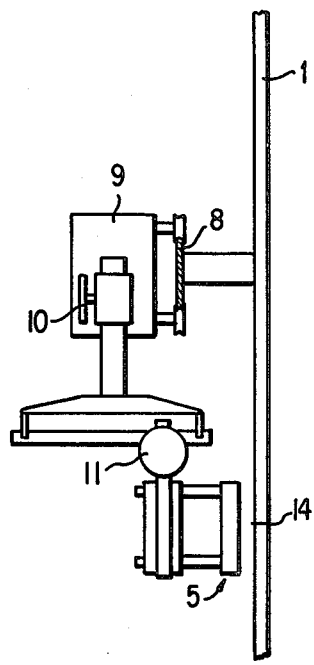
FIG. 12 is an elevational view of the welding apparatus shown in FIG. 11.
Figure 13:
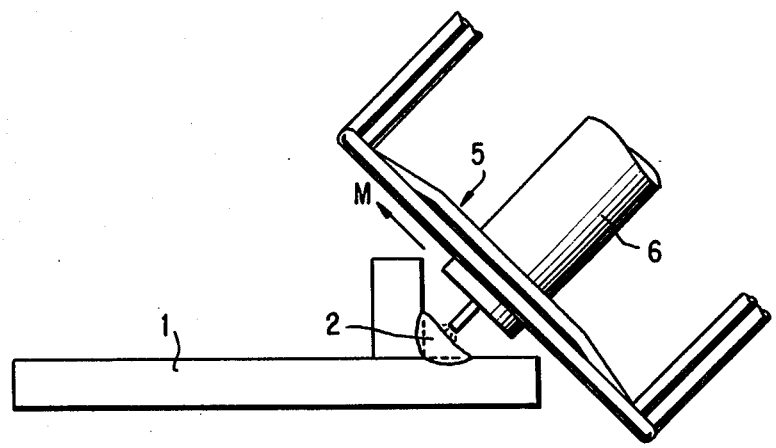
FIG. 13 is a diagram illustrating an embodiment in which the present invention is applied to fillet welding.

The apparatus shown in FIGS. 11 and 12 is one that is used for horizontal welding. Referring now to FIGS. 11 and 12, in the apparatus mounted on a running carriage 9 running on a rail 8 laid out on a base metal 1, in order to set a MIG torch 6 and a coil 5 surrounding the torch at positions appropriate with respect to the weld line 14, there are disposed a nob 10 for adjusting the position of the coil in the vertical direction, a nob 11 for adjusting the position of the coil in the horizontal direction, a nob 12 for adjusting the position of the torch in the vertical direction and a nob 13 for adjusting the position of the torch in the horizontal direction.

As will be apparent from the foregoing illustration, according to the present invention, by adopting novel means of applying a shifting magnetic field to a molten metal pool and causing in the molten metal pool a force capable of coping with the gravity, the molten metal pool can be maintained in a desirable shape in the weld zone, and the welding can be performed at a high efficiency irrespective of welding positions and a high quality of weld metal can be guaranteed. In addition, there are many excellent effects as described below.

(1) Since the molten metal pool is not substantially shaken or vibrated even if a force enough to cope with the gravity is applied to the molten pool, the quantity of the weld metal in the weld zone can be increased in welding of any welding position, and hence, the welding efficiency can be enhanced. According to conventional methods, it is quite impossible to enhance the welding speed in welding positions other than the flat position, without use of a special backing material for preventing falling-out of the molten metal pool, to such a high level as attainable by flat welding. In contrast, according to the present invention, this limitation of the welding speed can be eliminated.

(2) In the case where preceding of the molten metal readily takes place, it is necessary to enhance the welding speed excessively, and this enhancement of the welding speed results in increase of the number of deposited layers and reduction of the welding efficiency. According to the present invention, even in such case, the shape of the molten metal can be controlled appropriately, and preceding of the molten metal can be prevented and the deposited thickness per pass can be increased. Furthermore, occurrence of humping in the bead can be effectively prevented at the high speed welding, and therefore, the welding speed can be further enhanced and the welding efficiency can be further improved.

(3) Lack of fusion caused by preceding of the molten metal can be prevented, and sufficient fusion and high quality can be guaranteed.

(4) When the shifting magnetic field is caused to act from the back face, an effect customarily attained by a backing strip or the like can be attained, and one-side welding can be performed without using a backing strip or the like and a good back bead can be obtained.

(5) An effect corresponding to the weaving effect can be attained if the direction of the shifting magnetic field is reversed at a predetermined interval, and the bead width, penetration depth and bead appearance can be appropriately adjusted.

(6) By a simple method of disposing electric connecting means in the groove portion of materials to be welded, welding troubles caused by a shifting magnetic field or alternating magnetic field (a magnetic field showing an electromagnetic change at a certain time interval and being capable of shifting to cause a positional change) can be effectively prevented and the welding operation can be remarkably stabilized. Thus, the welding can be accomplished at a high efficiency and a weld metal having a high quality can be obtained assuredly.

Obviously, numerous modifications and variations of the present invention are possible in light of the above teachings. It is therefore to be understood that within the scope of the appended claims, the invention may be practiced otherwise than as specifically described herein.

What is claimed is:

1. A welding apparatus for controlling shapes of molten metal pools, which comprises means for supplying heat energy for welding, means for moving said energy supplying means relatively to a base metal to be welded, means for generating in the vicinity of a molten metal pool a magnetic field making a periodical electromagnetic change and means for moving said magnetic field generating means relatively to the base metal wherein said means for generating a magnetic field includes a pair of driving coils and said driving coils are disposed so that their centers are staggered from each other by a distance corresponding to the radius of at least one of said driving coils.

2. A welding apparatus as set forth in claim 1 wherein said means for supplying heat energy includes an arc welding rod inserted into a space defined by said driving coils.

3. A welding apparatus as set forth in claim 1 wherein each of said driving coils comprise a main coil portion, driving coil terminals, and a subsidiary coil for preventing induction coupling.

4. A welding apparatus for controlling shapes of molten metal pools, which comprises means for supplying heat energy for welding, means for moving said energy supply means relatively to a base metal to be welded, means for generating in the vicinity of a molten metal pool a magnetic field making a periodical electromagnetic change and means for moving said magnetic field generating means relatively to the base metal wherein said means for generating a magnetic field includes at least one pair of driving coils each coil consisting of a main coil and an interconnected subsidiary coil and means for passing at least two electric currents having different phases through said driving coils.

5. A welding apparatus as set forth in claim 4 wherein said means for supplying heat energy includes an arc welding rod inserted into a space defined by said driving coils.

* * * * *

UNITED STATES PATENT AND TRADEMARK OFFICE
CERTIFICATE OF CORRECTION

PATENT NO. : 4,190,760
DATED : February 26, 1980
INVENTOR(S) : Motomi Kano et al It is certified that error appears in the above-identified patent and that said Letters Patent are hereby corrected as shown below:

Please correct the Foreign Application Priority Data to read as follows:

[30]--- Foreign Application Priority Data---
-May 16, 1976 [JP] Japan......51/56235-

Signed and Sealed this

First Day of July 1980

[SEAL]

Attest:

SIDNEY A. DIAMOND

Attesting Officer

Commissioner of Patents and Trademarks